United States Patent
Lor

(10) Patent No.: US 8,249,638 B2
(45) Date of Patent: Aug. 21, 2012

(54) DEVICE AND METHOD FOR PARTICIPATING IN A PEER-TO-PEER NETWORK

(75) Inventor: Kar-Wing Edward Lor, Hong Kong (CN)

(73) Assignee: Hong Kong Applied Science and Technology Research Institute Company Limited, Shatin, New Territores (HK)

( * ) Notice: Subject to any disclaimer, the term of this patent is extended or adjusted under 35 U.S.C. 154(b) by 933 days.

(21) Appl. No.: 12/059,787

(22) Filed: Mar. 31, 2008

(65) Prior Publication Data

US 2009/0247207 A1    Oct. 1, 2009

(51) Int. Cl.
*H04W 40/00*    (2009.01)
*H04B 7/00*    (2006.01)

(52) U.S. Cl. ......... 455/518; 455/517; 455/454; 455/446

(58) Field of Classification Search ............ 455/517, 455/422.1, 426.1, 435.1, 446, 445, 450, 452.1, 455/454, 458, 550.1, 519, 518; 709/224, 709/201, 228, 204, 223, 238, 227; 370/254, 370/400, 392, 255
See application file for complete search history.

(56) References Cited

U.S. PATENT DOCUMENTS

| | | | |
|---|---|---|---|
| 6,961,537 B2 | 11/2005 | Rajaram | |
| 7,283,832 B2 | 10/2007 | Jia et al. | |
| 7,286,841 B2 | 10/2007 | Sun et al. | |
| 7,308,266 B2 | 12/2007 | Du et al. | |
| 2003/0125063 A1 | 7/2003 | Svensson et al. | |
| 2005/0220134 A1 | 10/2005 | Lin | |
| 2006/0160527 A1 | 7/2006 | Tran Xuan et al. | |
| 2006/0218222 A1* | 9/2006 | Brahmbhatt et al. | 709/201 |
| 2006/0262785 A1 | 11/2006 | Duggal et al. | |
| 2007/0091872 A1 | 4/2007 | Bergenwall | |
| 2007/0171910 A1 | 7/2007 | Kumar | |
| 2007/0258396 A1 | 11/2007 | Tiraspolsky | |
| 2008/0305791 A1* | 12/2008 | Hiben et al. | 455/435.1 |
| 2009/0070465 A1* | 3/2009 | Zhang | 709/224 |

OTHER PUBLICATIONS

"A Platform and Applications for Mobile Peer-to-Peer Communications"; Kato et al.; 2003; 5 pp.
Mobile IP; http://en.wikipedia.org/wiki/Mobile_IP; last modified Jul. 28, 2011; 5 pp.
Mobile IP; http://web.archive.org/web/20071114062650/http://en.wikipedia.org/wiki/Mobile_IP; last modified Nov. 14, 2007; 3 pp.

* cited by examiner

*Primary Examiner* — John J Lee
(74) *Attorney, Agent, or Firm* — Wells St. John P.S.

(57) ABSTRACT

A device for participating in a distributed peer-to-peer communications network has a distributed network application that includes a capability-routing entity having capability information for a group of associated peers participating in the network. A method for establishing peer-to-peer communication in the network including determining which of the group of associated peers can fulfil the requested connection based in the capability information and referring the request to the peer that can fulfil the connection.

18 Claims, 3 Drawing Sheets

DEVICE AND METHOD FOR PARTICIPATING IN A PEER-TO-PEER NETWORK

BACKGROUND TO THE INVENTION

1. Field of the Invention

The current invention relates to peer-to-peer networks and in particular to a device and method for participating in a peer-to-peer network 2. Background Information The so-called web 2.0 phenomenon involving information sharing and collaboration has sparked increasing demand for peer-to-peer networking. Peer-to-peer networking involves diverse inter-connectivity between members of a network in which all members are simultaneously both clients and servers to other members of the network. Early peer-to-peer networks were an overlay on the internet and included a centralised registration and discovery server. With the increased popularity of wireless and mobile networking involving multiple devices in both local and personal area networks pure decentralised peer-to-peer networks, which lack a centralised registration and discovery server, have become more popular.

One of the problems facing developers of peer-to-peer networks is the diversity in devices connecting to the network and the dynamic nature of network members brought about by the increased popularity in mobile networking devices such as laptops, handheld PCs, PDAs and mobile telephones for example Some members of the network are permanent or more stable members such as desktop PCs and TV set top boxes, while other members are transient such as laptops, PDAs and mobile telephones. Not every type of device in the network is suited to every type of peer-to-peer connection, for example two-way communications, web log and web forum browsing are resource light applications suitable for most of the devices, but video streaming and large file download are only suitable applications for high power devices more stable members such as desktop PCs and TV set top boxes. These factors pose quality of service and network discovery, lockup and routing issues for network designers.

In addition, an increase in the number and type of networkable devices means that a user member of a peer-to-peer network may typically connect to the network using a plurality of different types of device such as a desktop or home PC, a television set top box, a laptop and a handheld device such as a mobile phone or PDA. In current peer-to-peer network architectures each device belonging to the same user is a unique member of the distributed network and the user has no way of coordinating and best utilising the strengths and weaknesses of the different types of device within the network architecture.

Accordingly, it is an object of the present invention to provide a device for participating in a distributed peer-to-peer network, and a method for establishing peer-to-peer communications in a distributed peer-to-peer network, which seeks to ameliorate the above disadvantages by providing means to best utilise the capabilities of members of a peer-to-peer network. It is a further object of the present invention to provide said device and said method to at least offer the public with a useful alternative.

SUMMARY OF THE INVENTION

In view of the foregoing, there is disclosed herein a device for participating in a distributed peer-to-peer communications network has a distributed network application that includes a capability-routing entity having capability information for a group of associated peers participating in the network. There is also disclosed herein a method for establishing peer-to-peer communication in the network including determining which of the group of associated peers can fulfill the requested connection based in the capability information and referring the request to the peer that can fulfill the connection.

Preferably, the device further comprises a routing lookup table and the capability-routing entity is an entry in the routing lookup table.

Preferably, the capability information comprises a peer-to-peer network application capability of each member of the group of peers.

Preferably, the group of associated peers comprises a plurality of associated devices each having different peer-to-peer network application capabilities.

Preferably, the plurality of associated devices are devices having a common user.

Preferably, the peer-to-peer network application capability comprises a type of peer-to-peer service and device availability.

Preferably, the capability information is selected from a group comprising VoIP client, instant message client, streaming recipient, streaming source, file download recipient, file download source, web-log and web-forum viewer.

Further aspects of the invention will become apparent from the following description, which is given by way of example only.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
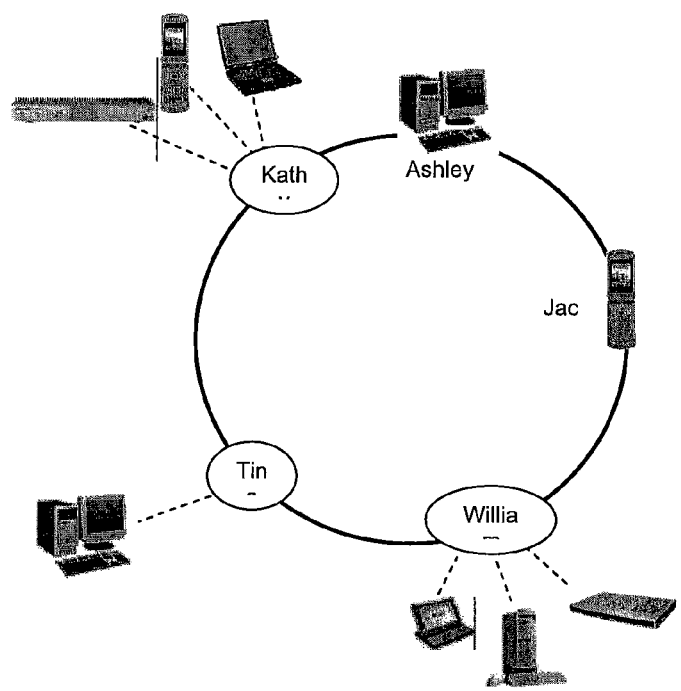
FIG. 1 is a schematic overview of a network peer groups according to the invention.
Figure 2:
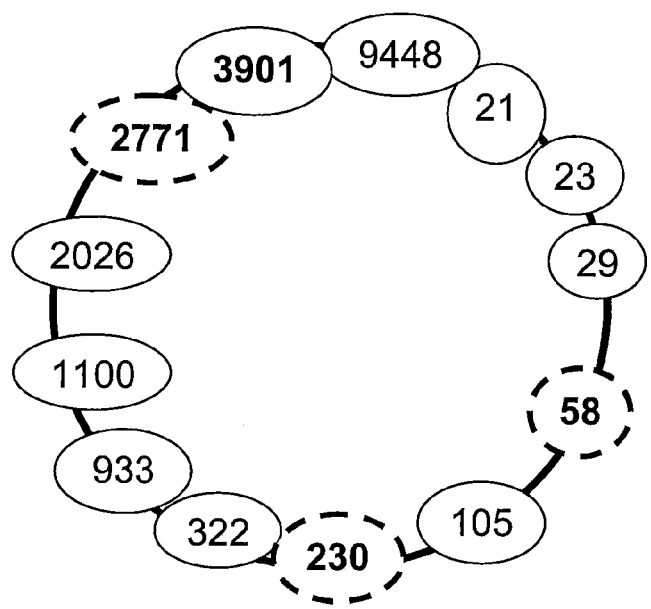
FIG. 2 is a schematic overview of the peer-to-peer network participants.

A description of the invention will now be given by a way of example only as practised in a distributed peer-to-peer network. Such a network is based on a decentralised distributed lookup service such as that using, but not limited to, a distributed hash table (DHT) in which responsibility for maintaining the mapping of hash keys and associated data values is distributed amongst members of the network. Well known DHT protocols include CAN (content addressable network), CHORD, Pastry and Tapestry. However, this not intended to limit the scope of use or functionality of the invention, which may also be implemented in a centralised registry or hybrid peer-to-peer network.

In the preferred embodiment of the invention a group of associated devices, typically belonging to the same user or having a common user, and which all might be participant in a peer-to-peer network either for an extended time or transiently, are represented in the device discovery or lookup procedure by a capability-routing entity which includes capability information relating to each of the members of the group. In exemplary embodiment the capability-routing entity comprises an entry in a routing table for providing capability based routing information for the group of associated devices and no physical capability-routing entity exists in the network. Each member of the group is a peer in the network in its own right but the members share capabilities so that the capability-routing entity receives connection requests for all members of the group and refers the request to a member of the group having the most appropriate capability to respond to or server the connection request.

In an exemplary embodiment of the invention a first user of a peer-to-peer network has several network capable devices including a home PC, an IP-television set-top box, an Internet-enabled Personal Video Recorder, a laptop computer and a network capable mobile telephone that can all participate in a peer-to-peer network. Each device has different characteristics, such as mains power or battery operation, storage capacity, CPU power, and network connection speed and status (i.e. online or offline), which determine its network application capabilities. The home PC has high CPU power, large storage capacity, is mains powered and connected to the peer-to-peer network continuously or for extended periods of time. It is therefore capable of providing or responding to all types of network applications including receiving and sending streaming music or video, receiving and sending small and large file transfers, participating in two-way communications such as VoIP or instant messaging, and web-log and web-forum browsing. The television set-top box is also connected to the peer-to-peer network continuously or for extended periods of time but is only suitable for receiving video streaming or file downloads. The laptop computer has lower CPU power and smaller storage capacity than the home PC, is battery powered and is only connected to the peer-to-peer network for transient periods of time. It is suitable for VoIP or instant message communications, viewing web logs and web forums, receiving streaming video or music and small file downloads. The mobile telephone likewise has low relative CPU power and storage capacity, is battery operated and is only connected to the peer-to-peer network for transient periods of time. It is only suitable for VoIP and instant messaging, small file downloads and viewing web logs and web forums.

The peer-to-peer network routing table includes an entry for a capability-routing entity for the group of devices belonging to the first user. The entry includes network application capability information of each member of the group. If a second user of the peer-to-peer network wants to check whether the first user can participate in a particular network application (for example file sharing, video streaming etc) the second user can look up the first user's capability-routing entity in the network routing table and obtain capability information for devices of the first user. The second user of the network can then send a message in turn to the devices of the first user that have the desired application capability requesting the desired connection. If the first application capable member is online and can service the request it will answer the request and the desired connection can be established. However, if the first application capable member is off line or is not capable of servicing the request at that time then the request is sent to the next member of the group with the desired capabilities.

The invention is further illustrated with reference to FIG. 1 which shows a peer-to-peer network with user members having more that one device for connecting to the network. The devices for each user are given in the following table.

| User | Devices |
| --- | --- |
| Jack | Smartphone |
| William | Internet tablet, Internet-based storage and IP-TV Set-Top-Box |
| Tina | Desktop PC |
| Kathy | Laptop (mobile or docked), Smartphone, Internet-enabled Personal Video Recorder |
| Ashley | Desktop PC |

In accordance with the invention each user having a group of associated device has a capability-routing entity having capability information for the group of devices. The network ID and description of the devices, including capability-routing entities, are given in the following table.

| Peer ID | Devices |
| --- | --- |
| 21 | Jack's Smartphone |
| 23 | William's Internet-based storage |
| 29 | Kathy's Internet-enabled PVR |
| 58 | William's capability-routing entity |
| 105 | Kathy's laptop (mobile) |
| 230 | Tina's capability-routing entity |
| 322 | Tina's desktop PC |
| 933 | William's IPTV STB |
| 1100 | Kathy's laptop (docked) |
| 2026 | Kathy's Smartphone |
| 2771 | Kathy's capability-routing entity |
| 3901 | Ashley's desktop PC |
| 9448 | William's Internet tablet |

In the network participants 21 and 3901 are peers of known type. The remaining participants however are all members of peer groups each associated with a capability-routing entity. In the illustrated embodiment there are three capability-routing entities each being a virtual node in the peer-to-peer network. The first capability-routing entity is virtual node 2771 which is the capability-routing entity for a peer group comprising network participants 1100, 29, 2026, 105. The second capability-routing entity 230 is a virtual node representing participant 322. The third capability-routing entity is virtual node 58 representing the peer group comprising participants 933, 23, 9448.

Routing in the peer-to-peer network overlay is based on the CHORD distributed hash table protocol, however this is not intended to limit the scope of use of functionality of the invention and another distributed peer-to-peer network protocol may be used. The peer-to-peer network runs on top of the Internet which controls how data is routed between members of the peer-to-peer network. In the CHORD protocol each participant member of the peer-to-peer network is arranged in a logical circle having a successor and predecessor. Each member of the network is assigned a network ID, or node key, and a network address which is the physical IP address and port number of the member. The node keys are split to distribute ownership of different key values amongst the participating members in the network. Each member maintains a hash table (part of the distributed hash table) for ID and address for participants falling under the keyspace it is responsible for. If a member of the network, a source member, is looking to communicate with another member, a destination member, it passes a message to its successor in the network circle requesting address details of the destination member. If the successor is not responsible for the keyspace that includes the network ID of the destination member then it passes the message to the next member in the circle and so forth until the message reaches a member who is responsible for the keyspace which includes the network ID of the destination member. That member uses a consistent hashing algorithm to search a lookup table and identify the IP address and port number of the destination member, which is returned to the source member that may then request a direct connection with the destination member. A full explanation and source code of the CHORD protocol can be downloaded and used under a free software licence from the Massachusetts Institute of Technology (MIT).

In order to provide capability based routing according to the invention the normal distributed hash table (DHT) used for device lookup is replaced by a capability based distributed hash table (CDHT) which includes an entry for capability based entities having capability information for each user that has group of associated devices. An example of the capability based distributed hash table (CDHT) is illustrated below.

| Peer ID | Peer Type | Application Capability Information | Device Status |
|---|---|---|---|
| 21 | Terminating | video_streaming_source: self | on |
| 23 | Terminating | video_streaming_source: none | on |
| 29 | Terminating | video_streaming_source: self | on |
| 58 | Routing | video_streaming_source: {933} | on |
| 105 | Terminating | video_streaming_source: self | on |
| 230 | Routing | video_streaming_source: {322} | on |
| 322 | Terminating | video_streaming_source: self | on |
| 933 | Terminating | video_streaming_source: self | on |
| 1100 | Terminating | video_streaming_source: self | on |
| 2026 | Terminating | video_streaming_source: none | on |
| 2771 | Routing | video_streaming_source: {29, 105 or 1100} | on |
| 3901 | Terminating | video_streaming_source: none | on |
| 9448 | Terminating | video_streaming_source: none | on |

The CDHT includes the peer or member ID and physical address (IP address and port number) as in the conventional DHT and also includes application capability information for each member of the network. The capability information includes, but is not limited to, type information indicating whether the node is a terminating node of the known type or is a capability-routing entity known in the current invention, an application profile which provides the devices capability for different types of connection requests and the device status. In order to simplify the table and the current explanation the application profile is only shown for video streaming source type connection requests. In actual embodiments of the invention the application profile will contain information for one or more connection application types including, but not limited to, source and destination for video streaming, large file download, two-way communications, web log and web forum browsing.

Turning to the application profile for each device, this can have one of three states which is either an identifier of another peer, self or none. The nodes of known type, 21 and 3901, and other nodes that support a video streaming source have the profile 'self' indicating they can act as a video streaming source. Within virtual node 2771 it is identified that video streaming sources in its peer group include nodes 29, 105 and 1100. Thus node 2026 cannot provide or act as a video streaming source and is appropriately identified as none. Within virtual node 58 only node 933, the set top box, is identified as providing a video streaming source and hence nodes 9448 and 23 cannot provide a video streaming source and are identified as none. In the invention a request from a source node for the address of a destination node which is a member of a peer group represented by a virtual capability-routing entity will eventually passed to the capability-routing entity. The capability-routing entity is then able to identify whether the members whose address is being requested can act, for example, as a video streaming source. In the embodiment illustrated in FIG. 1 if a video streaming source is requested from member 2026 then capability-routing entity 2771 knows that device 2026 cannot provide a video streaming source and so the request is referred to one of devices 29, 105 or 1100 depending on the online availability of said members.

Figure 3:
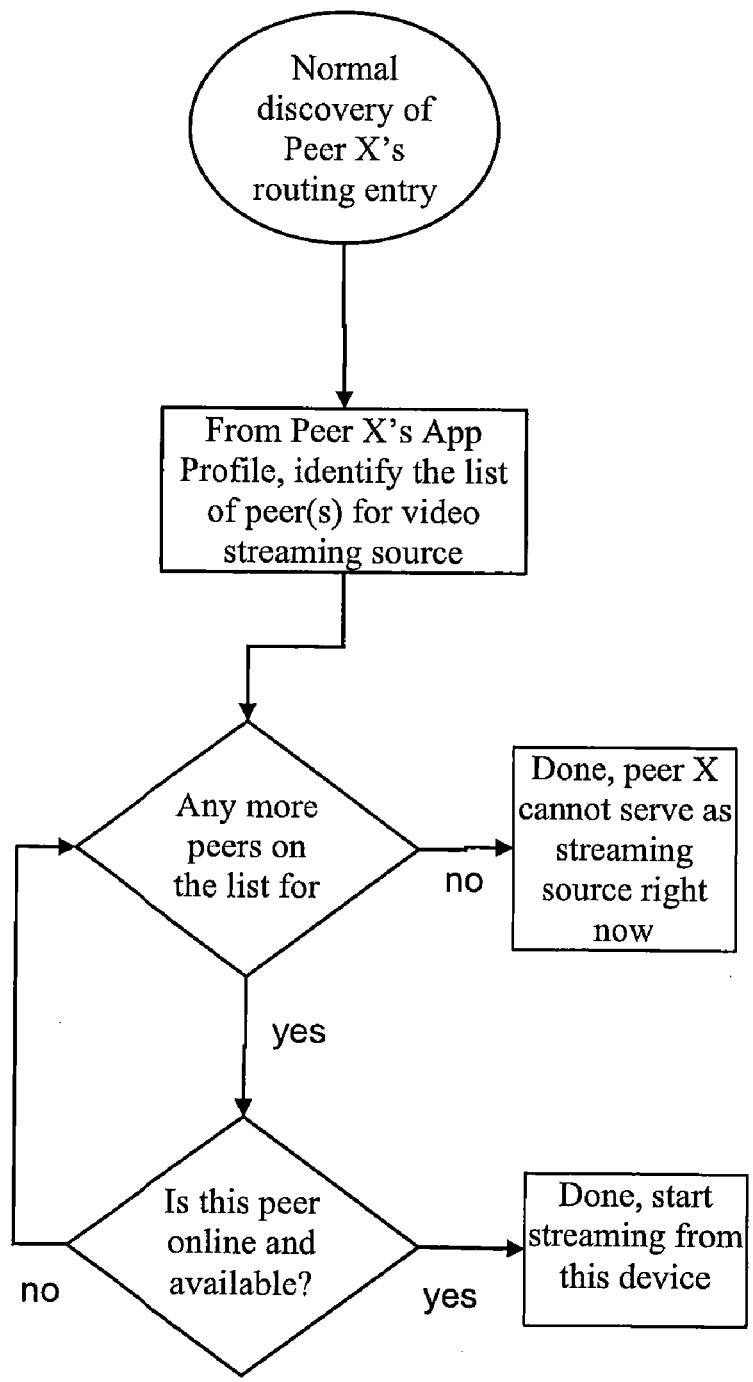
FIG. 3 is an exemplary flow diagram of peer discovery/routing according to the invention.
Figure 4:
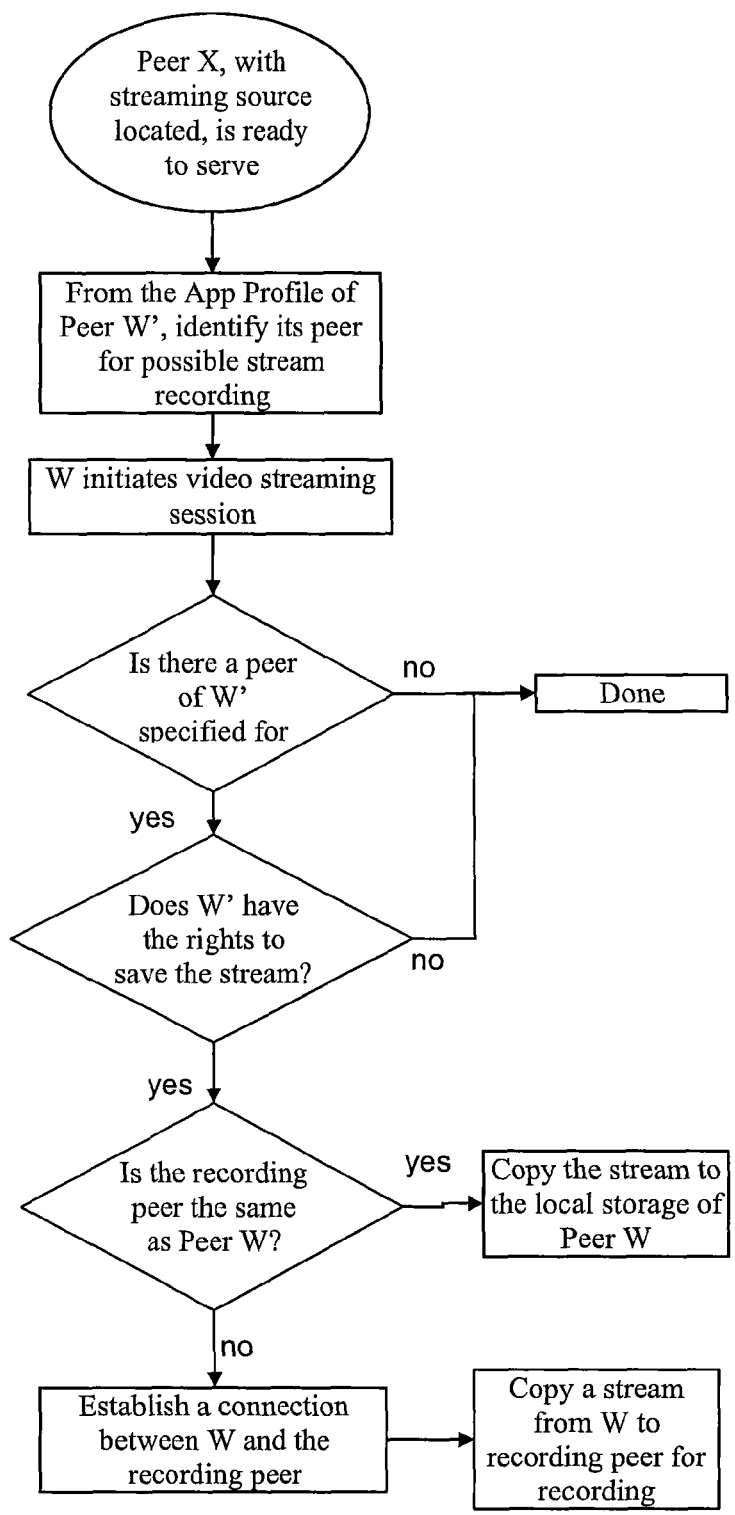
FIG. 4 is a second exemplary flow of peer discovery/routing according to the invention.

FIGS. 3 and 4 are flow diagrams of implementation of the invention. In FIG. 3 normal discovery of a peer (X) via CDHT is requested. From peer X's application profile a list of the peers that can accept video streaming from within its group are identified. If none of the peers that can act as a video streaming source are available online a message that X cannot serve as a streaming source is sent. If a device to substitute for X in video streaming is online then the request is referred to the substitute device for acting as video streaming source.

It is also possible according to the invention for a device to respond to a connection request, but also use members of its peer group to facilitate additional functionality. This is illustrated in FIG. 4. A video streaming source for peer X has been identified in FIG. 3. The requester of the stream, peer W, will then receive a copy of the streaming video and wants to also record a copy of the video, but does not have video stream recording application or sufficient disk space. Within the profile of peer W there may be an identifier of a peer for possible video stream recording, for example a TV set top box. Node W initiates a video streaming session and at the same time a check is made to determine whether there is a peer of W specified for video stream recording. If not, then the video scream is viewed on W and nothing is recorded. If a peer is specified for video stream recording then a check is made as to whether W has rights to save the scream. If W does have rights to save the scream then another check is made as to whether W is both the viewing and recording peer. If yes, then the scream is viewed and saved at W. If no, then a second connection is established between W and the recording peer and a copy of the video scream is streamed from W to the recording peer for recording.

It should be appreciated that modifications and alternations obvious to those skilled in the art are not to be considered as beyond the scope of the present invention. For example, in the exemplified embodiment the capability based entity was simply an entry in a Capability based distributed hash table. In other embodiments, however, the capability-routing entity may be one of the group of associated devices, or another physical member of the network, containing capability routing information for the group of associated devices.

What is claimed is:

1. A user device for participating in a distributed peer-to-peer communications network, the user device including a distributed network application comprising a capability-routing entity having capability information for a group of associated peers participating in the network and in response to a connection request involving a source peer of the group referring the request to a destination peer of the group based on the capability information, such that a direct connection is established between the source peer and the destination peer.

2. The user device of claim 1 wherein the user device further comprises a routing lookup table based on a distributed hash table and the capability-routing entity is an entry in the routing lookup table.

3. The user device of claim 1 wherein the capability information comprises a peer-to-peer network application capability of each peer of the group.

4. The user device of claim 3 wherein the group of associated peers comprises a plurality of associated user devices each having different peer-to-peer network application capabilities.

5. The user device of claim 4 wherein the plurality of associated user devices are user devices having a common user, the plurality of associated user devices all participating in the distributed peer-to-peer communications network.

6. The user device of claim 3 wherein the peer-to-peer network application capability comprises a type of peer-to-peer service and device availability.

7. The user device of claim 1 wherein the capability information is selected from a group comprising VoIP client, instant message client, streaming recipient, streaming source, file download recipient, file download source, web-log and web-forum viewer.

8. The user device of claim 1, wherein the source peer in the step of referring the request passes a message to its successor in a network circle requesting address details of the destination peer.

9. A method for establishing peer-to-peer communication in a distributed peer-to-peer communications network including a group of associated peers that are user devices participating in the network, the method comprising:

receiving a connection request for one of the group of peers, determining which of the group of associated peers can fulfill the requested connection, and referring the request to the peer that can fulfill the connection based upon capabilities of the referred peer corresponding to a specific type of the connection request.

10. The method of claim 9 further including providing a routing lookup table including a capability-routing entity having capability information for the group of associated peers, the routing lookup table being based on a distributed hash table.

11. The method of claim 10 wherein determining which of the group of associated peers can fulfill the requested connection is based on the capability information in the routing lookup table.

12. The method of claim 11 wherein the capability information comprises a peer-to-peer network application capability of each peer of the group.

13. The method of claim 11 wherein the peer-to-peer network application capability comprises a type of peer-to-peer service and device availability.

14. The method of claim 11 wherein the capability information is selected from a group comprising VoIP client, instant message client, streaming recipient, streaming source, file download recipient, file download source, web-log and web-forum viewer.

15. The method of claim 9 wherein the group of associated peers comprises a plurality of associated user devices each having different network peer-to-peer network application capabilities.

16. The method of claim 15 wherein the plurality of associated user devices are user devices having a common user, the plurality of associated user devices all participating in the distributed peer-to-peer communications network.

17. The method of claim 9 wherein determining which of the group of associated peers can fulfill the requested connection is based on one or more factors selected from a group comprising power supply, CPU power, storage capacity and network connection characteristics.

18. A method for establishing peer-to-peer communication in a distributed peer-to-peer communications network including a group of associated peers that are user devices participating in the network, the method comprising:

receiving a connection request for one of the group of peers;

identifying a requested peer as not having a capability corresponding to the request; and referring the request to an appropriate peer that can fulfill the connection.

* * * * *